(12) United States Patent
Knobel et al.

(10) Patent No.: US 12,502,783 B2
(45) Date of Patent: Dec. 23, 2025

(54) METHOD AND A DEVICE FOR PICKING AND PLACING ITEMS

(71) Applicant: ABB Schweiz AG, Baden (CH)

(72) Inventors: Henrik Knobel, Täby (SE); Roy Fraser, Lymm (GB)

(73) Assignee: ABB Schweiz AG, Baden (CH)

( * ) Notice: Subject to any disclaimer, the term of this patent is extended or adjusted under 35 U.S.C. 154(b) by 579 days.

(21) Appl. No.: 17/753,695

(22) PCT Filed: Sep. 16, 2019

(86) PCT No.: PCT/EP2019/074725
§ 371 (c)(1),
(2) Date: Mar. 11, 2022

(87) PCT Pub. No.: WO2021/052561
PCT Pub. Date: Mar. 25, 2021

(65) Prior Publication Data
US 2022/0331963 A1    Oct. 20, 2022

(51) Int. Cl.
B25J 9/16    (2006.01)
B25J 9/00    (2006.01)
B65G 47/52    (2006.01)
B65G 47/90    (2006.01)

(52) U.S. Cl.
CPC .......... B25J 9/1682 (2013.01); B25J 9/0084 (2013.01); B25J 9/0093 (2013.01); B25J 9/1676 (2013.01);
(Continued)

(58) Field of Classification Search
CPC ...... B25J 9/1682; B25J 9/0084; B25J 9/0093; B25J 9/1676; B25J 9/1623; B25J 9/1666;
(Continued)

(56) References Cited

U.S. PATENT DOCUMENTS

2009/0320416 A1* 12/2009 Tischhauser ............ B65B 5/105
53/473
2011/0224821 A1* 9/2011 Fortman ............... B65G 47/682
901/30
(Continued)

FOREIGN PATENT DOCUMENTS

CA         2567705 A1    9/2007
CN       107150032 A     9/2017
(Continued)

OTHER PUBLICATIONS

International Search Report and Written Opinion of the International Searching Authority; Application No. PCT/EP2019/074725; Completed: Jun. 4, 2020; Mailing Date: Jun. 18, 2020; 23 Pages.
(Continued)

*Primary Examiner* — Abby Lin
*Assistant Examiner* — Esvinder Singh
(74) *Attorney, Agent, or Firm* — Whitmyer IP Group LLC

(57) ABSTRACT

A method for picking and placing items includes the steps of: providing a picking conveyor transporting items to be picked; providing a placing conveyor to which the items are to be placed; and providing a plurality of robots configured to move the items from pick positions on the picking conveyor to place positions on the placing conveyor. For at least one of the plurality of robots there is defined an actual work area $A_{ac}$ that fulfils the condition $A_{ac}<A_{th}-(A_{ol}+A_{ex})$, wherein $A_{th}$ is a theoretical work area, $A_{ol}$ is an overlapping work area and $A_{ex}$ is an excessive work area of the respective robot. By limiting the actual work area $A_{ac}$ of the robots more than what is done conventionally, the total workload between the robots in pick and place systems may be balanced.

21 Claims, 2 Drawing Sheets

(52) U.S. Cl.
CPC .......... *B65G 47/52* (2013.01); *B65G 47/905* (2013.01); *B25J 9/1623* (2013.01); *G05B 2219/39001* (2013.01); *G05B 2219/39106* (2013.01); *G05B 2219/45063* (2013.01)

(58) Field of Classification Search
CPC . B25J 9/003; B25J 9/163; B25J 9/1664; B25J 9/1669; B25J 9/1697; B25J 11/0095; B25J 11/0045; B65G 47/52; B65G 47/905; B65G 47/72; G05B 2219/39001; G05B 2219/39106; G05B 2219/45063; G05B 2219/37555; G05B 2219/39135; G05B 19/4182; G05B 2219/40053; G05B 2219/39102; G05B 2219/40007; Y02P 90/02

See application file for complete search history.

(56) References Cited

U.S. PATENT DOCUMENTS

| | | | |
|---|---|---|---|
| 2013/0173051 A1* | 7/2013 | Bellante | G05B 19/4182 700/230 |
| 2018/0029233 A1 | 2/2018 | Lager | |
| 2018/0215034 A1* | 8/2018 | Jean | B25J 9/0093 |
| 2018/0250818 A1* | 9/2018 | Maeda | B25J 9/1682 |

FOREIGN PATENT DOCUMENTS

| | | |
|---|---|---|
| CN | 107206590 A | 9/2017 |
| CN | 110234473 A | 9/2019 |
| DE | 19625637 A1 | 1/1998 |
| DE | 29818932 U1 | 2/2000 |
| JP | H06348321 A | 12/1994 |

OTHER PUBLICATIONS

International Preliminary Report on Patentability; Application No. PCT/EP2019/074725; Completed: Mar. 15, 2022; 10 Pages.

Chinese Office Action; Application No. 1019801001464; Completed: Mar. 6, 2024; 10 Pages.

Chinese Second Office Action and Seaarch Report; Application No. 2019801001464; Completed: Jul. 8, 2024; 10 Pages.

* cited by examiner

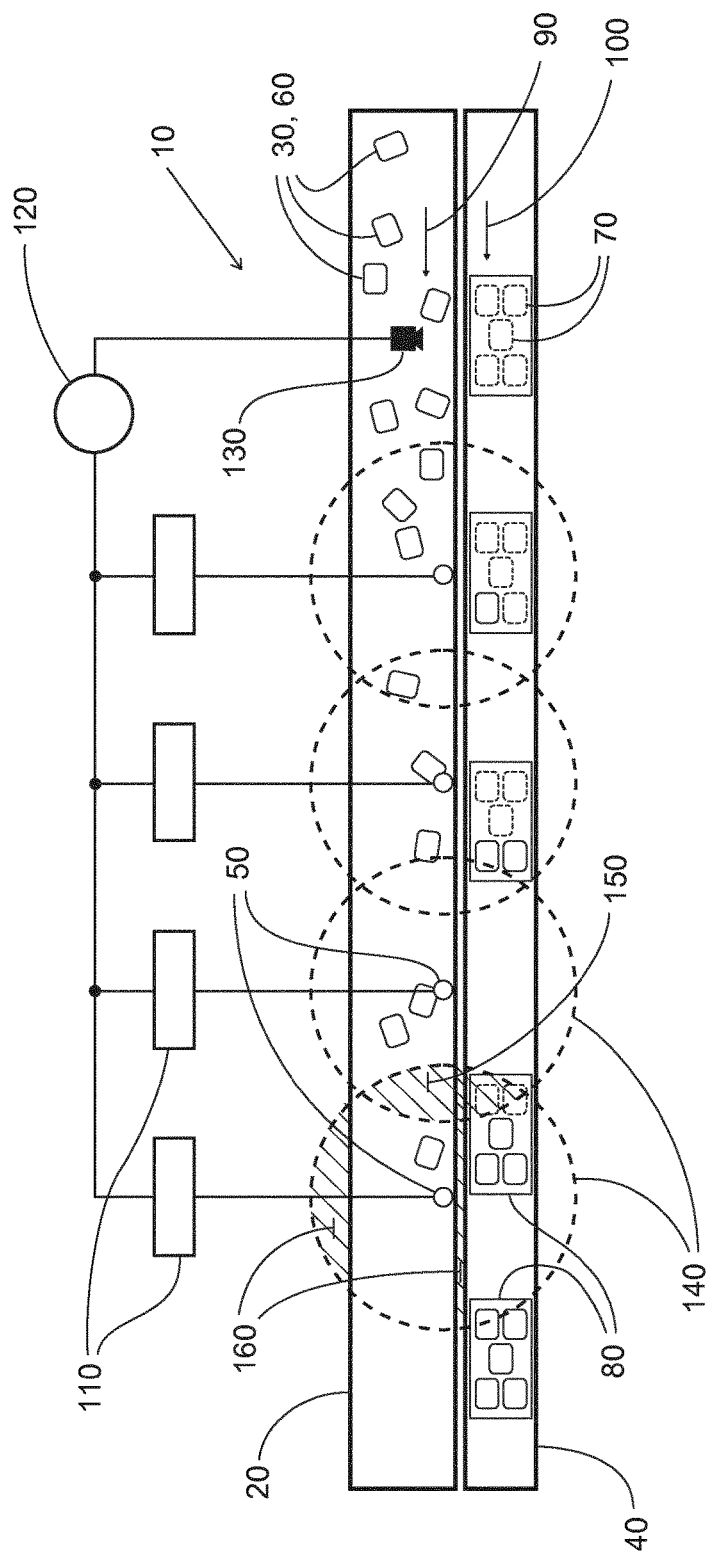
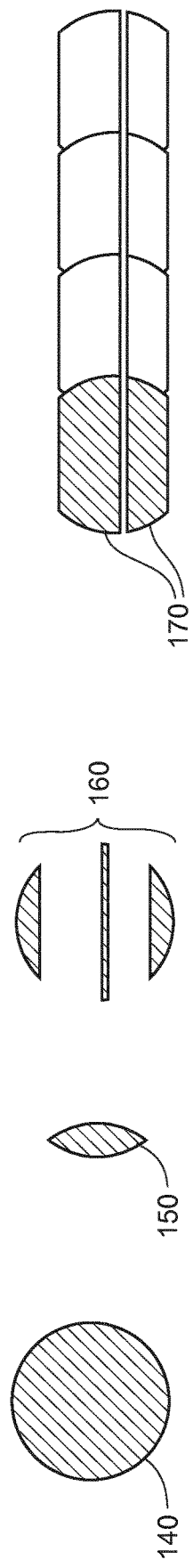
Fig. 1a
Fig. 1b
Fig. 1c
Fig. 1d
Fig. 1e

METHOD AND A DEVICE FOR PICKING AND PLACING ITEMS

TECHNICAL FIELD

The present invention relates to robot applications with pick and place processes.

BACKGROUND

Referring to FIG. 1a, a conventional pick and place system 10 may comprise a picking conveyor 20 transporting items 30 to be picked, a placing conveyor 40 to which the items 30 are to be placed, and a plurality of robots 50 configured to move the items 30 from pick positions 60 on the picking conveyor 20 to place positions 70 on the placing conveyor 40. The robots 50 may preferably be parallel kinematics robots, such as delta robots, assembled above the picking conveyor 20 and the placing conveyor 40. In the example of FIG. 1a the place positions 70 are defined by containers 80 moving on along with the placing conveyor 40 and comprising recesses configured to receive the items 30. The picking conveyor 20 transports the items 30 in a first direction 90, and the placing conveyor 40 transports the place positions 70 in a second direction 100 parallel to the first direction 90. Instead of being parallel, the first and second directions 100 can also be opposite, cross each other at a 90 degrees angle or at any other suitable angle, and do not need to be in the same plane.

A conventional pick and place system 10 may further comprise robot controllers 110 configured to control the movements of the respective robots 50, and a master controller 120 configured to control the pick and place process. The master controller 120 may comprise a vision system 130 configured to detect the pick positions 60 and the place positions 70. The master controller 120 may continuously send all the pick positions 60 and all the place positions 70 to all robot controllers 110, and each robot controller 110 may inform all the remaining robot controllers 110 each time they are about to use (to empty or to fill) one of the pick or place positions 60, 70. All the robot controllers 110 thereby continuously keep an updated list of available pick and place positions 60, 70.

Each robot 50 has its theoretical work area $A_{th}$ 140, see FIG. 1b, within which the mechanical constraints of the respective robot 50 allow the robot 50 to pick and place items 30. In many cases the theoretical work areas $A_{th}$ 140 of neighboring robots 50 overlap, defining overlapping work areas $A_{ol}$ 150, see FIG. 1c, which can be reached by more than one, typically two, robots 50. If there is an overlapping work area $A_{ol}$ 150 it can be considered to fulfil the condition $A_{ol}>0$, otherwise it can be considered to fulfil the condition $A_{ol}=0$. It may be appropriate to prevent a robot 50 from entering an overlapping work area $A_{ol}$ 150 in order to prevent collisions between two neighboring robots 50, which solution is known e.g., from US20130173051A1. In addition, the theoretical work areas $A_{th}$ 140 often stretch beyond the picking conveyor(s) 20 and/or the placing conveyor(s) 40 defining excessive work areas $A_{ex}$ 160, see FIG. 1d, which the respective robots 50 can reach but where there are no pick nor place positions 60, 70. For example, in the case of the example of FIG. 1a the gap between the picking conveyor 20 and the placing conveyor 40 constitutes a part of an excessive work area $A_{ex}$ 160. In exceptional cases pick and place systems 10 may also contain obstacles other than neighbouring robots 50 that define non-accessible areas $A_{n-a}$. For the purposes of this disclosure such non-accessible areas $A_{n-a}$ may be considered to constitute part of the excessive work areas $A_{ex}$ 160.

Consequently, the theoretical work areas $A_{th}$ 140 are typically not fully utilized in that they contain portions within which the robots 50 never execute any tasks. Instead, each robot 50 has an actual work area $A_{ac}$ 170, see FIG. 1e, within which the robot 50 operates i.e., picks and places items 30. There is no reason to limit the actual work area $A_{ac}$ 170 more than what follows from the aforementioned reasons if a robot 50 is supposed to execute as many pick and place tasks as possible.

In a successful pick and place process it is desirable that all the items 30 on the picking conveyor 20 are picked and that all the place positions 70 on the placing conveyor 40 are filled before the respective items 30 and place positions 70 exit the actual work area $A_{ac}$ 170 of the most downstream robot 50. In conventional pick and place systems 10 there are often issues with unbalanced workloads between the robots 50, which in its turn may lead to stops of picking and placing conveyors 20, 40. When the most upstream robot 50 picks and places as many items 30 as it can, it may e.g. happen that the more downstream robots 50 don't have enough items 30 to pick to fill empty place positions 70 left over by the most upstream robot 50. In order to prevent empty place positions 70 from leaving the pick and place system 10, it may be necessary to slow down or to stop the placing conveyor 40 before the empty place positions 70 exit the actual work area $A_{ac}$ 170 of the most downstream robot 50. This in its turn may cause the most upstream robot 50 not being able to place any items 30 as it already filled all the empty place positions 70 within its actual work area $A_{ac}$ 170, resulting in an overflow of items 30 on the picking conveyor 20 at a later stage, and in a necessity to slow down or to stop the picking conveyor 20 before the items 30 exit the actual work area $A_{ac}$ 170 of the most downstream robot 50.

It is known to arrange picking conveyors 20 and placing conveyors 40 in counterflow, i.e. the second direction 100 opposite to the first direction 90, to solve some of the aforementioned issues, but this is not always feasible for reasons like factory layout, and it does not always provide a satisfactory solution to all issues.

There remains a desire to balance the total workload between the robots 50 in pick and place systems 10 such that undesired fluctuations in the workloads of individual robots 50 are avoided.

SUMMARY

One object of the invention is to provide an improved method for picking and placing items.

A further object of the invention is to provide an improved pick and place system.

These objects are achieved by the method and the device according to the claims.

The invention is based on the realization that by limiting the actual work area $A_{ac}$ 170 of robots more than what is done conventionally, the total workload between robots in pick and place systems may be balanced.

According to a first aspect of the invention, there is provided a method for picking and placing items. The method comprises the steps of: providing a picking conveyor transporting items to be picked; providing a placing conveyor to which the items are to be placed; and providing a plurality of robots configured to move the items from pick positions on the picking conveyor to place positions on the placing conveyor. For at least one of the plurality of robots there is defined an actual work area $A_{ac}$ that fulfils the condition $A_{ac}<A_{th}-(A_{ol}+A_{ex})$, wherein $A_{th}$ is a theoretical work area, $A_{ol}$ is an overlapping work area and $A_{ex}$ is an excessive work area of the respective robot.

According to one embodiment of the invention, each actual work area $A_{ac}$ consists of a pick area $A_{pick}$ and a place area $A_{place}$.

According to one embodiment of the invention, the method further comprises the step of dynamically changing at least one of the shape, size and location of at least one pick area $A_{pick}$ or at least one place area $A_{place}$.

According to one embodiment of the invention, the change in the shape, size and/or location is based on pick and place tasks carried out in the past.

According to one embodiment of the invention, the method further comprises the step of defining for each of a plurality of robots an actual work area $A_{ac}$ that fulfils the condition $A_{ac}<A_{th}-(A_{ol}+A_{ex})$.

According to one embodiment of the invention, the method further comprises the step of defining for at least one of the plurality of robots an actual work area $A_{ac}$ that fulfils the condition $A_{ac} \geq A_{th}-(A_{ol}\ A_{ex})$.

According to one embodiment of the invention, the method further comprises the step of defining for the most downstream robot an actual work area $A_{ac}$ that fulfils the condition $A_{ac} \geq A_{th}-(A_{ol}+A_{ex})$.

According to one embodiment of the invention, the method further comprises the step of defining the pick area $A_{pick}$ of at least one robot to be further away from the placing conveyor than that of a more downstream robot.

According to one embodiment of the invention, the method further comprises the step of defining the place area $A_{place}$ of at least one robot to be further away from the picking conveyor than that of a more downstream robot.

According to one embodiment of the invention, the method further comprises the step of defining the pick area $A_{pick}$ and/or the place area $A_{place}$ of at least one robot to be smaller in size than that of a more downstream robot.

According to one embodiment of the invention, the method further comprises the step of illustrating to an operator at least part of at least one actual work area $A_{ac}$.

According to a second aspect of the invention, there is provided a pick and place system comprising: a picking conveyor transporting items to be picked, a placing conveyor to which the items are to be placed, and a plurality of robots configured to move the items from pick positions on the picking conveyor to place positions on the placing conveyor. At least one of the plurality of robots has an actual work area $A_{ac}$ that fulfils the condition $A_{ac}<A_{th}-(A_{ol}+A_{ex})$, wherein $A_{th}$ is a theoretical work area, $A_{ol}$ is an overlapping work are and $A_{ex}$ is an excessive work area of the respective robot.

According to one embodiment of the invention, the pick and place system further comprises a master controller configured to allocate to each robot an actual work area $A_{ac}$ consisting of a pick area $A_{pick}$ and a place area $A_{place}$, and further configured to dynamically change at least one of the shape, size and location of at least one pick area $A_{pick}$ or one place area $A_{place}$.

According to one embodiment of the invention, each of the plurality of robots is a parallel kinematics robot such as a delta robot.

According to one embodiment of the invention, at least one overlapping work area $A_{ol}$ fulfils the condition $A_{ol}>0$.

BRIEF DESCRIPTION OF THE DRAWINGS

The invention will be explained in greater detail with reference to the accompanying drawings, wherein
FIG. 1a shows a conventional pick and place system,
FIG. 1b shows a theoretical work area $A_{th}$ of a robot,
FIG. 1c shows an overlapping work area $A_{ol}$ of a robot,
FIG. 1d shows an excessive work area $A_{ex}$ of a robot,
FIG. 1e shows actual work areas $A_{ac}$ of four robots.

DETAILED DESCRIPTION

Figure 2:
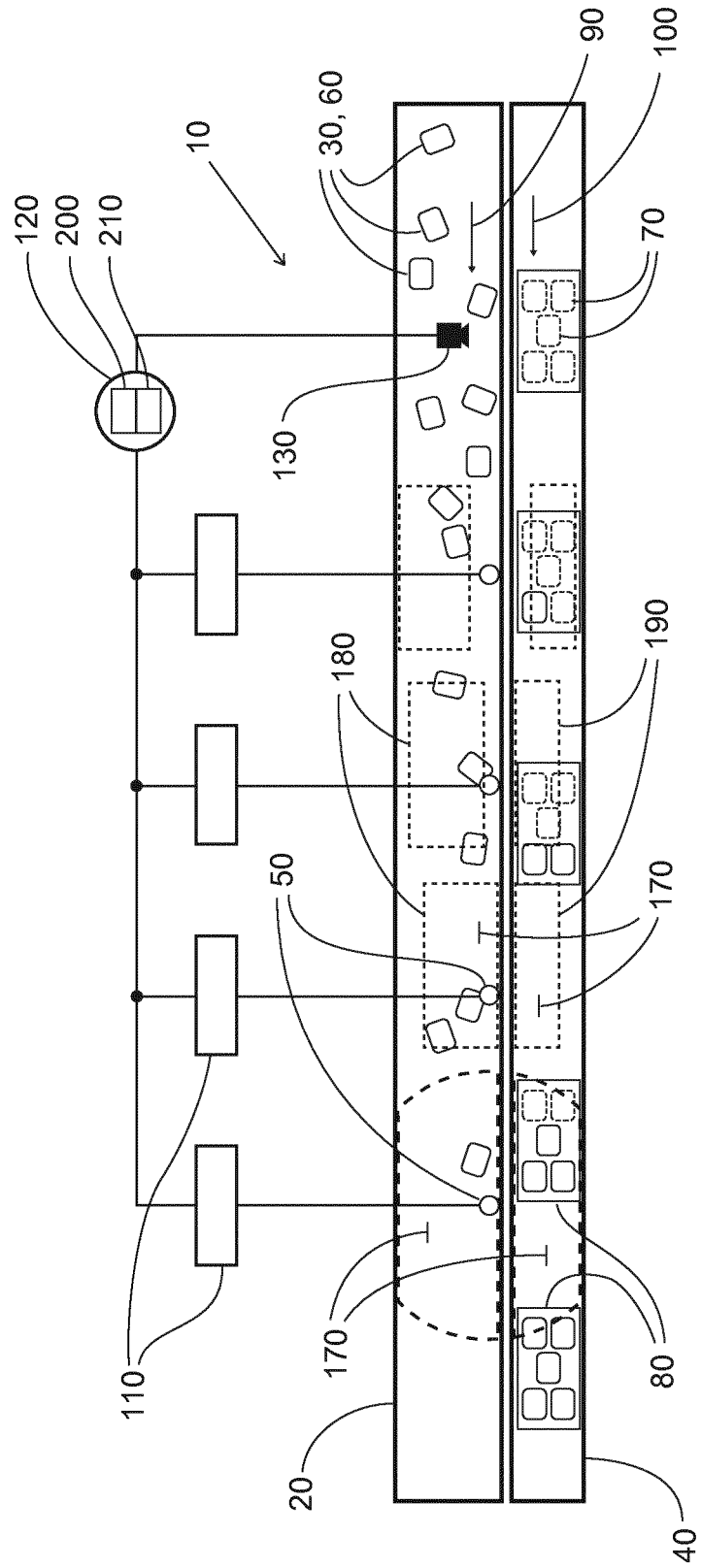
FIG. 2 shows a pick and place system according to one embodiment of the invention.

Referring to FIG. 2, a pick and place system 10 according to one embodiment of the present invention may comprise, in addition to the elements of the conventional pick and place system 10 of FIG. 1a, pick areas $A_{pick}$ 180 and place areas $A_{place}$ 190 which define within which areas the respective robots 50 are allowed to pick items 30 and place items 30, respectively, and which together define the actual work area $A_{ac}$ 170 of the respective robot 50. This can be expressed as $$A_{ac} = A_{pick} + A_{place} \quad (1),$$

wherein $A_{ac}$ is the actual work area 170, $A_{pick}$ is the pick area 180 and $A_{place}$ is the place area 190 of the respective robot 50.

According to the example of FIG. 2, the most upstream robot 50 is only allowed to pick items 30 at the part of the picking conveyor 20 furthest away from the placing conveyor 40, and to place items 30 at the part of the placing conveyor 40 furthest away from the picking conveyor 20. The actual work area $A_{ac}$ 170 of the most upstream robot 50 is thereby smaller in relative terms than in many conventional pick and place systems 10. This can be expressed as $$A_{ac} < A_{th}-(A_{ol}+A_{ex}) \quad (2),$$

wherein $A_{ac}$ is the actual work area 170, $A_{th}$ is a theoretical work area 140, $A_{ol}$ is an overlapping work area 150 and $A_{ex}$ is an excessive work area 160 of the respective robot 50 (the right side of the equation representing an example of an actual work area $A_{ac}$ 170 in a conventional pick and place system 10). Pick areas $A_{pick}$ 180 and place areas $A_{place}$ 190 for the two middlemost robots 50 are defined in a corresponding way, while for the most downstream robot 50 the actual work area $A_{ac}$ 170 is defined in a conventional way.

The pick areas $A_{pick}$ 180 and the place areas $A_{place}$ 190 may have any appropriate shapes, sizes and locations as long as they fulfil the conditions of equations (1) and (2). The pick areas $A_{pick}$ 180 or the place areas $A_{place}$ 190 do not need to consist of single continuous areas i.e., each of them may be divided into a plurality of portions. The shapes, sizes and locations may change dynamically i.e., during the pick and place process. For example, the pick areas $A_{pick}$ 180 and the place areas $A_{place}$ 190 may be allocated by the master controller 120. Initially the actual work areas $A_{ac}$ 170 of all the robots 50 may be defined in a conventional way according to FIG. 1e. Each robot controller 110 may report to the master controller 120 the pick or place positions 60, 70 they have used, and the master controller 120 may contain one or more area algorithms 200 that calculate, based on the pick and place tasks carried out in the past, new pick areas $A_{pick}$ 180 and place areas $A_{place}$ 190 to better balance the workload. For example, if the most upstream robot 50 executes three times as many picks as the most downstream robot 50, the pick area $A_{pick}$ 180 of the most upstream robot 50 may be decreased to even out the number of picks between the two robots.

The pick and place system 10 may furthermore comprise visualizing means (not shown) to visually illustrate to an operator (not shown) some or all of the pick areas $A_{pick}$ 180 and the place areas $A_{place}$ 190. For example, the master controller 120 may comprise a digital twin of the pick and place system 10, and a display may show a real time illustration of the digital twin together with illustrations of the current pick areas $A_{pick}$ 180 and the current place areas $A_{place}$ 190. The operator could e.g., be able to see an illustration corresponding to FIG. 2. Alternatively, the visualizing means may comprise an augmented reality (AR) headset illustrating to the operator an environment of the real pick and place system 10 together with AR illustrations of the current pick areas $A_{pick}$ 180 and the current place areas $A_{place}$ 190.

The master controller 120 may furthermore contain one or more machine learning algorithms 210 designed to constantly improve the area algorithms 200 based on the earlier experience. As the actual work area $A_{ac}$ 170 may change dynamically, it can be appropriate that the master controller 120 sends all the pick positions 60 and all the place positions 70 to all robot controllers 110 even if the respective positions would lie outside of the actual work area $A_{ac}$ 170 of one or more robots 50.

It is not excluded that actual work areas $A_{ac}$ 170 of two or more neighboring robots 50 overlap a common overlapping work area $A_{ol}$ 150 of the robots 50, or that the actual work areas $A_{ac}$ 170 of two or more neighboring robots 50 overlap each other. Provided that prevention of collisions between the robots 50 is managed in an alternative way, it is fully possible to allow the robots 50 to operate within actual work areas $A_{ac}$ 170 that overlap each other.

It will be appreciated that there are numerous ways of defining whether an item 30 or a place position 70 shall be considered to be within a pick area $A_{pick}$ 180 or a place area $A_{place}$ 190 of a robot 50 or not. There is both a space aspect and a time aspect. For example, the question may be whether the whole item/place position 30, 70 or just a certain part of it shall be within, and at what moment the item/place position 30, 70 shall be within. One solution is to define that when a certain point of each item/place position 30, 70 which the tool center point (TCP) of the robot 50 needs to reach in order to pick or to place the item 30 is within the respective pick area $A_{pick}$ 180 or place area $A_{place}$ 190, the respective item/place position 30, 70 shall be considered to be within that area. Furthermore, as according to the present embodiment of the invention the actual work area $A_{ac}$ 170 is defined to be the sum of the pick area $A_{pick}$ 180 and the place area $A_{place}$ 190 (equation 1), it is logical to define that the decisive point in time is the instant of the respective pick or place action. It will be appreciated that there is a delay between a decision by the respective robot controller 110 to pick or place an item 30 and the instant at which the respective pick or place action takes place. According to the present embodiment of the invention the respective robot controller 110 calculates an estimation of the delay for each item/place position 30, 70, and only considers those items/place positions 30, 70 that are within the respective pick area $A_{pick}$ 180 or place area $A_{place}$ 190 at an estimated instant of the respective pick or place action.

Further elaborating the example of FIG. 2, the robot controller 110 of the most upstream robot 50 receives from the master controller 120 all the pick positions 60 and place positions 70 detected by the vision system 130. The robot controller 110 saves the positions in a list that it constantly updates, calculates estimated pick delays (delay in picking an item 30 from the current robot position) for all available pick positions 60, and furthermore calculates for each pick position 60 place delays (delay in placing an item 30 from the respective pick position 60) for all available place positions 70. The robot controller 110 then takes a decision to pick one of the items 30 based on the robots 50 current pick area $A_{pick}$ 180 together with an algorithm governing the picking order, excluding all the pick positions 60 considered to be outside of the current pick area $A_{pick}$ 180. As soon as the item 30 is picked, the robot controller 110 takes a decision to place it in one of the place positions 70 based on the robots 50 current place area $A_{place}$ 190 together with an algorithm governing the placing order, excluding all the place positions 70 considered to be outside of the current place area $A_{place}$ 190. As soon as an item 30 is picked or placed the respective robot controller 110 removes the respective pick or place position 60, 70 from its list. The same applies when an item 30 or a place position 70 passes the respective theoretical work area $A_{th}$ 140 of a robot 50.

It may be advantageous to let the more upstream robots 50 to make the largest movements i.e., to define the pick areas $A_{pick}$ 180 to be further away from the placing conveyor 40 and/or the place areas $A_{place}$ 190 to be further away from the picking conveyor 20 than those of more downstream robots 50. It may furthermore be advantageous to let the pick areas $A_{pick}$ 180 and/or the place areas $A_{place}$ 190 of more upstream robots 50 to be smaller in size than those of more downstream robots 50. It may furthermore be advantageous to define the pick areas $A_{pick}$ 180 to overlap in the first direction 90 and/or to define the place areas $A_{place}$ 190 to overlap in the second direction 100. In case of ambiguity, locations of pick areas $A_{pick}$ 180 and place areas $A_{place}$ 190 are to be defined by their assumed mass centers. It may furthermore be advantageous not to limit the actual work area Aar 170 of the most downstream robot 50 more than what follows from the reasons mentioned in the background section of this disclosure i.e. the actual work area $A_{ac}$ 170 of the most downstream robot 50 may advantageously be defined in a conventional way whereby it is configured to execute as many pick and place tasks as possible.

The invention is not limited to the embodiments shown above, but the person skilled in the art may modify them in a plurality of ways within the scope of the invention as defined by the claims.

The invention claimed is:

1. A method for picking and placing items, the method comprising the steps of: providing a picking conveyor transporting items to be picked; providing a placing conveyor to which the items are to be placed; and providing a plurality of robots configured to move the items from pick positions on the picking conveyor to place positions on the placing conveyor; wherein defining for at least one of the plurality of robots an actual work area A.sub.ac that fulfils the condition A.sub.ac<A.sub.th−(A.sub.ol+A.sub.ex),
    wherein A.sub.th is a theoretical work area, A.sub.ol is an overlapping work area and A.sub.ex is an excessive work area of the respective robot.

2. The method according to claim 1, wherein each actual work area A.sub.ac consists of a pick area A.sub.pick and a place area A.sub.place.

3. The method according to claim 2, further comprising the step of dynamically changing at least one of the shape, size and location of at least one pick area A.sub.pick or at least one place area A.sub.place.

4. The method according to claim 3, wherein the change in the shape, size and/or location is based on pick and place tasks carried out in the past.

5. The method according to claim 1, further comprising the step of defining for each of a plurality of robots an actual work area $A_{ac}$ that fulfils the condition $A_{ac} < A_{th} - (A_{ol} + A_{ex})$.

6. The method according to claim 1, further comprising the step of defining for at least one of the plurality of robots an actual work area $A_{ac}$ that fulfils the condition $A_{ac} \geq A_{th} - (A_{ol} + A_{ex})$.

7. The method according to claim 6, further comprising the step of defining for the most downstream robot an actual work area $A_{ac}$ that fulfils the condition $A_{ac} \geq A_{th} - (A_{ol} + A_{ex})$.

8. The method according to claim 1, further comprising the step of defining the pick area $A_{pick}$ of at least one robot to be further away from the placing conveyor than that of a more downstream robot.

9. The method according to claim 1, further comprising the step of defining the place area $A_{place}$ of at least one robot to be further away from the picking conveyor than that of a more downstream robot.

10. The method according to claim 1, further comprising the step of defining the pick area $A_{pick}$ and/or the place area $A_{place}$ of at least one robot to be smaller in size than that of a more downstream robot.

11. The method according to claim 1, further comprising the step of illustrating to an operator at least part of at least one actual work area $A_{ac}$.

12. The method according to claim 1, wherein each of the plurality of robots is a parallel kinematics robot such as a delta robot.

13. The method according to claim 1, wherein at least one overlapping work area $A_{ol}$ fulfils the condition $A_{ol} > 0$.

14. The method according to claim 1, wherein the actual work area is an area within which the robot can operate, the theoretical work area is an area within which mechanical constraints of the robot allow the robot to pick and place items, the overlapping work area is an area where theoretical work areas of neighboring robots overlap, and the excessive work area is an area within the theoretical work area but where there are no pick positions or place positions.

15. A pick and place system comprising: a picking conveyor transporting items to be picked, a placing conveyor to which the items are to be placed, and a plurality of robots configured to move the items from pick positions on the picking conveyor to place positions on the placing conveyor, wherein at least one of the plurality of robots has an actual work area $A_{ac}$ that fulfils the condition $A_{ac} < A_{th} - (A_{ol} + A_{ex})$, wherein $A_{th}$ is a theoretical work area, $A_{ol}$ is an overlapping work area and $A_{ex}$ is an excessive work area of the respective robot.

16. The pick and place system according to claim 15, further comprising a master controller configured to allocate to each robot an actual work area $A_{ac}$ consisting of a pick area $A_{pick}$ and a place area $A_{place}$, and further configured to dynamically change at least one of the shape, size and location of at least one pick area $A_{pick}$ or one place area $A_{place}$.

17. The pick and place system according to claim 15, wherein each of the plurality of robots is a parallel kinematics robot such as a delta robot.

18. The pick and place system according to claim 15, wherein at least one overlapping work area $A_{ol}$ fulfils the condition $A_{ol} > 0$.

19. A pick and place system comprising:
three or more robots arranged along a conveyor in an upstream-to-downstream sequence;
wherein each of the robots has an actual work area $A_{ac}$;
wherein an actual work area of the most upstream robot is the smallest of the actual work areas.

20. The system of claim 19, wherein each robot other than the most upstream robot has an actual work area that is larger than the actual work area of the next upstream robot.

21. The system of claim 20, further comprising a master controller that is configured to allocate to each robot its actual work area and to dynamically change at least one of the shape, size, or location of at least one of the actual work areas.

* * * * *